(12) United States Patent
Grau Unda et al.

(10) Patent No.: US 12,001,199 B2
(45) Date of Patent: Jun. 4, 2024

(54) METHOD, SYSTEM AND COMPUTER PROGRAM PRODUCT FOR EVALUATION OF ENERGY CONSUMPTION IN INDUSTRIAL ENVIRONMENTS

(71) Applicants: GESTAMP SERVICIOS, S.A., Madrid (ES); FUNDACIÓN TECNALIA RESEARCH AND INNOVATION, Gipuzkoa (ES)

(72) Inventors: Iñaki Grau Unda, Madrid (ES); Alicia Rubio Gaitán, Madrid (ES); Sergio Gil López, Gipuzkoa (ES); Eugenio Perea Olavarría, Gipuzkoa (ES); Izaskun Mendia Tellería, Gipuzkoa (ES); Adelaida Lejarazu Marquina, Gipuzkoa (ES)

(73) Assignee: GESTAMP SERVICIOS, S.A., Madrid (ES)

( * ) Notice: Subject to any disclaimer, the term of this patent is extended or adjusted under 35 U.S.C. 154(b) by 379 days.

(21) Appl. No.: 17/420,265

(22) PCT Filed: Dec. 30, 2019

(86) PCT No.: PCT/EP2019/087142
§ 371 (c)(1),
(2) Date: Jul. 1, 2021

(87) PCT Pub. No.: WO2020/141154
PCT Pub. Date: Jul. 9, 2020

(65) Prior Publication Data
US 2022/0091601 A1 Mar. 24, 2022

(30) Foreign Application Priority Data
Jan. 2, 2019 (EP) .................................. 19382002

(51) Int. Cl.
*G05B 23/02* (2006.01)
(52) U.S. Cl.
CPC ....... *G05B 23/0224* (2013.01); *G05B 23/027* (2013.01)

(58) Field of Classification Search
CPC .............. G05B 23/0224; G05B 23/027; G06Q 10/0639
See application file for complete search history.

(56) References Cited

U.S. PATENT DOCUMENTS

| 6,772,052 B1 | 8/2004 | Amundsen et al. |
| 8,989,910 B1 * | 3/2015 | Klots ..................... G06Q 50/06 702/179 |

(Continued)

FOREIGN PATENT DOCUMENTS

CN 106249681 A 12/2016

OTHER PUBLICATIONS

International Search Report dated Apr. 7, 2020 re: Application No. PCT/EP2019/087142, pp. 1-3, citing: US 8 989 910 B1, US 10 120 353 B2 and US 2015/0316904 A1.

(Continued)

*Primary Examiner* — Manuel L Barbee
(74) *Attorney, Agent, or Firm* — CANTOR COLBURN LLP (57) ABSTRACT

A method for evaluating energy consumption in an industrial plant, includes capturing sensor data from at least one level of the industrial plant, from the sensor data, digitally obtaining energy consumption curves, an energy consumption curve representing, along a certain time period, discrete values of energy consumption corresponding to time intervals $\Delta t$. The method also includes applying a clustering algorithm for digitally computing K energy consumption patterns, wherein each pattern represents a set of energy consumption curves grouped according to a similarity metric and includes discrete values of energy consumption corresponding to time intervals $\Delta t$; capturing data of production achieved during the time period at at least one level; calculating the aggregated sum of the discrete values, thus obtaining the aggregated energy consumption for each curve; and digitally establishing a relationship between aggregated energy consumption for each energy consumption curve during the time period and captured data of production.

14 Claims, 5 Drawing Sheets

(56) References Cited

U.S. PATENT DOCUMENTS

| | | | |
|---|---|---|---|
| 10,120,353 B2* | 11/2018 | Menzel | G05B 15/02 |
| 2015/0316904 A1 | 11/2015 | Govindaraj et al. | |
| 2019/0219989 A1* | 7/2019 | Venturi | G06Q 10/0631 |

OTHER PUBLICATIONS

Written Opinion dated Apr. 7, 2020 re: Application No. PCT/EP2019/087142, pp. 1-6, citing: US 8 989 910 B1, US 10 120 353 B2 and US 2015/0316904 A1.

Indian Office Action for Indian Application No. 202137029766 dated Jan. 16, 2023, 5 pages.

Bhatnager R. and Rao Ch., "Energy Resource Management Based on Data Mining and Artificial Intelligence", ACEEE Summer Study on Energy Efficiency in Industry, 2005, 10 pages.

Lee J., Kao H. A., and Yang S., "Service innovation and smart analytics for Industry 4.0 and big data environment", The 6th CIRP Conference on Industrial Product-Service Systems, Elsevier, vol. 16, pp. 3-8, 2014.

\* cited by examiner

METHOD, SYSTEM AND COMPUTER PROGRAM PRODUCT FOR EVALUATION OF ENERGY CONSUMPTION IN INDUSTRIAL ENVIRONMENTS

TECHNICAL FIELD

The present disclosure relates to the field of monitoring and analyzing energy consumption in industrial environments.

BACKGROUND

In the last decades, energy efficiency is a stated energy policy objective in nearly all countries. The arguments for improved energy efficiency in industrial environments and other buildings focus on reduced energy costs to manufacturers and consumers, security of energy supply, improved comfort, lower greenhouse gas emissions and a major contribution to the objective of sustainable development.

In industry, an improvement in energy efficiency is to be regarded as any action undertaken by a manufacturer that reduces energy use per unit of output without affecting the level of service provided. Energy efficiency improvements can therefore be considered at all stages of the various levels of industrial environments.

Nowadays, the so-called Industry 4.0 foresees the use of embedded intelligence by implementing cyber-physical systems (CPS) including data driven solutions based on big data frameworks and infrastructures. For example, Lee J., Kao H. A., and Yang S., Service innovation and smart analytics for Industry 4.0 and big data environment, The 6th CIRP Conference on Industrial Product-Service Systems, Elsevier, Vol. 16, pp. 3-8, 2014, disclose a CPS that uses adaptive learning algorithms to represent machine degradation and performance behaviour in the physical world.

Bhatnager R. and Rao Ch., Energy Resource Management Based on Data Mining and Artificial Intelligence, ACEEE Summer Study on Energy Efficiency in Industry, 2005 have described a set of data mining algorithms for determining typical temporal behaviors of utility consumption and the frequency of their occurrence. Thus, for different profiles of electric power consumption corresponding to a device, relevant usage patterns for the device are obtained. However, the proposed approach does not permit to perform integrated energy management of a whole industrial plant.

Therefore, there is a need to develop an improved method of energy management in an industrial plant.

SUMMARY

The computer-implemented method and system for evaluating energy consumption in industrial environments described in the present disclosure intends to solve the shortcomings of prior-art methods and systems therefor.

The method of the present disclosure performs an integrated analysis and evaluation of energy consumption in industrial plants. In embodiments of the disclosure, the industrial plant may be considered, from the point of view of the utility's connection point, as a collection of loads grouped at different submetering levels. Thanks to the deployment of IoT (Internet of Things), equipment like meters and gateways enable to measure a variety of physical magnitudes and to connect industrial components, enabling gathering of data at submetering levels. Through the analysis of patterns and production data never before observed and correlated, energy behaviors can be interpreted. In embodiments of the disclosure, energy inefficiencies in a production process can also be detected and the cause for those inefficiencies can be evaluated. Therefore, the method of the present disclosure permits to assess whether the discovered energy behaviors are due to production changes or not.

A first aspect of the disclosure relates to a computer-implemented method for evaluating the energy consumption in an industrial plant, comprising: at a plurality of time instants, capturing with a plurality of sensors, sensor data from at least one level of the industrial plant, wherein said plurality of sensors comprises energy measuring sensors; from said sensor data, digitally obtaining a plurality of energy consumption curves $x_j$, wherein $j=0, 1, 2, \ldots, J-1$, J being a natural number, an energy consumption curve representing, along a certain time period T, discrete values of energy consumption corresponding to time intervals $\Delta t$ into which said time period T is divided; from said energy consumption curves $x_j$, applying a clustering algorithm for digitally computing a plurality of K energy consumption patterns $C_k$, wherein $k=0, 1, 2, \ldots, K-1$, K being a natural number, $K<J$, wherein each energy consumption pattern $C_k$ represents a set of energy consumption curves $x_j$ grouped together according to a similarity metric, wherein each energy consumption pattern $C_k$ comprises discrete values of energy consumption corresponding to said time intervals $\Delta t$ into which said time period T is divided; capturing data of the production achieved during said time period T at said at least one level of the industrial plant; calculating, for each energy consumption curve belonging to each pattern, the aggregated sum of the discrete values of energy consumption during said time period T, thus obtaining the aggregated energy consumption for each energy consumption curve during said time period T; and digitally establishing a relationship between aggregated energy consumption for each energy consumption curve during said time period T and said captured data of production.

In embodiments of the disclosure, the stage of capturing with a plurality of sensors, sensor data from at least one level of the industrial plant, is done at periodic time instants separated at time intervals $\Delta t$.

In embodiments of the disclosure, the at least one level of the industrial plant is at least one of industrial plant, line, process, machine or component of a machine.

In embodiments of the disclosure, each energy consumption pattern $C_k$ is calculated as the mean value of each component $x_{ij}$ of each energy consumption curve $x_j$ belonging to said pattern.

In embodiments of the disclosure, the clustering algorithm applies the following iterative process for minimizing the distance between elements forming a cluster and its corresponding pattern:

$$\arg\min\{\Sigma_{i=1}^{I}\|x_{ij}-C_{ik}^{t}\| \forall k=1,\ldots,K\}$$

wherein $x_{ij}$ is the i-th component of the j-th energy consumption curve $x_j$, $C_{ik}^{t}$ is the i-th component of the k-th energy consumption pattern at time instant t, K is the total number of energy consumption patterns and I is the number of measurements within the whole time period, wherein the optimum number K of patterns for the whole set of curves $x_j$ $\forall$ $j=1, \ldots, J$ is given by the point of maximum deflection in the representation of the variance between groups divided by the total variance of the selection from the set of curves, that is to say:

$$\arg\max\left\{\left(\frac{VAR_{in}^{k+1}}{VAR}\right)-\left(\frac{VAR_{in}^{k}}{VAR}\right)\right\}, \forall k=1,\ldots,K$$

wherein $VAR_{in}$ is the variance between the elements of a group or cluster, and wherein $VAR_{in}$ is defined:

$$VAR_{in} = \Sigma_{k=1}^{K} n_k (C_k^t - \overline{C^t})/(K-1),$$

wherein K is the total number of energy consumption patterns, that is to say, the total number of groups of energy consumption curves related by a similarity metric defined for a group, $n_k$ is the number of elements forming the k-th group or curves, $C_k^t$ is the characteristic pattern for the k-th group of curves and $\overline{C^t}$ is the mean pattern of the whole selection of energy consumption curves.

In embodiments of the disclosure, fora new energy consumption curve obtained from sensor data at a new time period T, the degree of similarity/dissimilarity with respect to current patterns is evaluated by comparing the new energy consumption curve with the K patterns already defined and, if the new energy consumption curve mathematically fits in a previously defined pattern in terms of a similarity metric, it is determined that said new energy consumption curve belongs to said pattern in which the new energy consumption curve fits.

In embodiments of the disclosure, if the new energy consumption curve mathematically fits in a previously defined pattern in terms of a similarity metric, the new energy consumption curve is digitally compared with all the energy consumption curves that belong to the cluster represented by the pattern, thus comparing the new curve with the curve of maximum energy consumption and with the curve of minimum energy consumption.

In embodiments of the disclosure, if the new energy consumption curve belongs to an existing energy consumption pattern, the new energy consumption curve is associated to the group of curves represented by said pattern and the pattern is updated taking into account the new energy consumption curve.

In embodiments of the disclosure, if the new energy consumption curve does not fit in a previously defined pattern in terms of a similarity metric, it is determined if the new energy consumption curve represents an anomalous consumption or if it represents the appearance of a new type of energy consumption pattern.

In embodiments of the disclosure, if it is determined that the new energy consumption curve represents an anomalous consumption, triggering an alarm associated to the energy consumption.

In embodiments of the disclosure, the method further comprises: capturing data of the production achieved during the same time period T of the new energy consumption curve;

and digitally comparing the energy consumption and associated production during said time period of the new energy consumption curve, with the relationship energy versus production inferred from historic curves.

In embodiments of the disclosure, if as a result of the digital comparison it is determined that there is energy inefficiency, triggering an alarm associated to the production.

In embodiments of the disclosure, the method further comprises using sub-metering measurements in order to interpret the difference in energy consumption causing the anomalous consumption.

In embodiments of the disclosure, if an energy alarm is triggered, and/or a production alarm is triggered, a final alarm may be triggered, denoting an anomalous behavior that may indicate excessive energy consumption.

A second aspect of the disclosure relates to a system comprising processing means, the system being configured to perform the steps of the method already disclosed.

A third aspect of the disclosure relates to a computer program product comprising computer program instructions/code for performing the method of the first aspect of the disclosure.

A fourth aspect of the disclosure relates to a computer-readable memory/medium that stores program instructions/code for performing the method of the first aspect of the disclosure.

Additional advantages and features of the disclosure will become apparent from the detail description that follows and will be particularly pointed out in the appended claims.

BRIEF DESCRIPTION OF THE DRAWINGS

To complete the description and in order to provide for a better understanding of the disclosure, a set of drawings is provided. Said drawings form an integral part of the description and illustrate an embodiment of the disclosure, which should not be interpreted as restricting the scope of the disclosure, but just as an example of how the disclosure can be carried out. The drawings comprise the following figures.

DETAILED DESCRIPTION OF THE DRAWINGS

Figure 1:
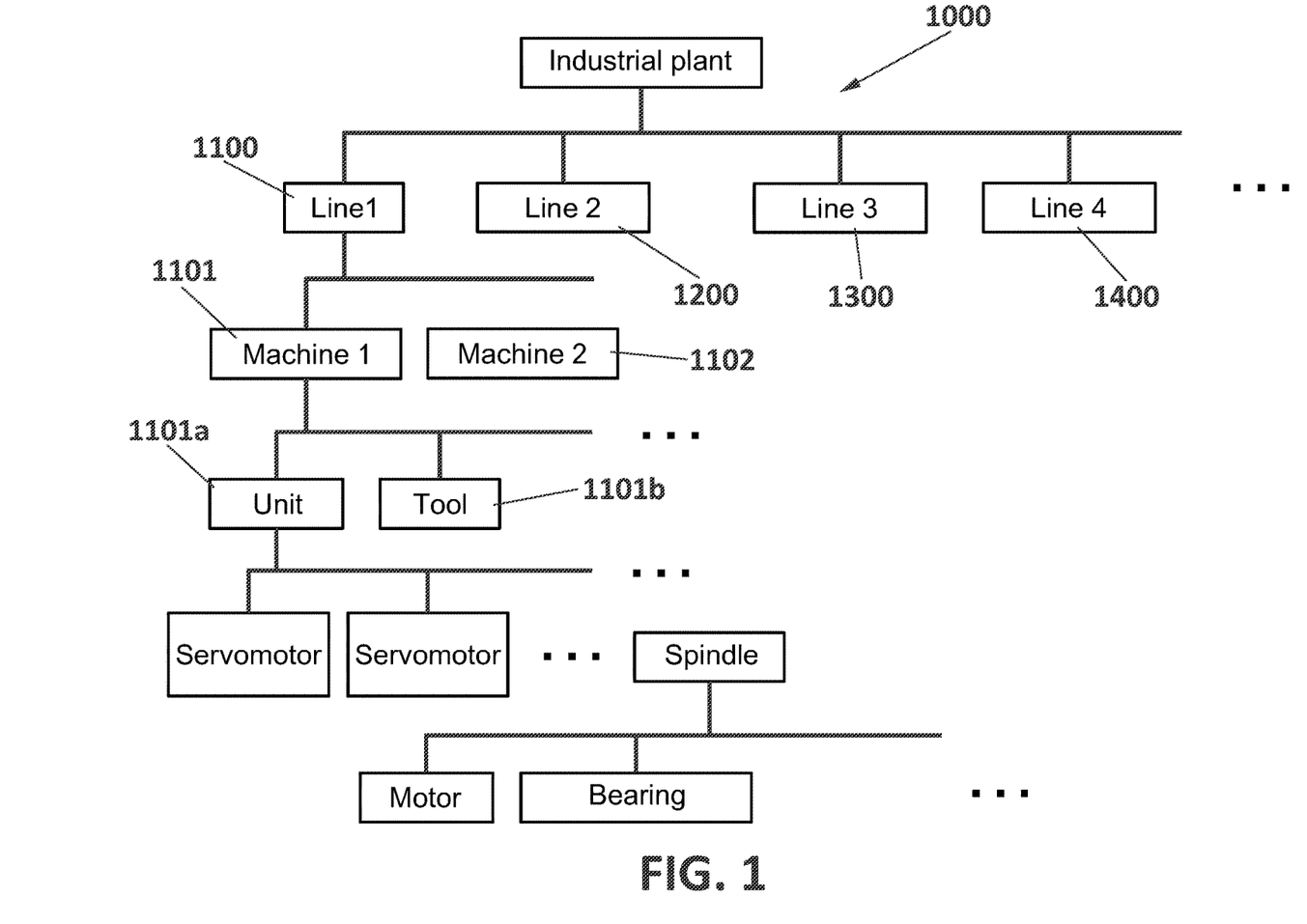
FIG. 1 shows a schematic diagram of the industrial infrastructure of a company.

FIG. 1 schematically shows the levels into which the infrastructure of an industrial plant may be divided. In an upper level 1000 an industrial plant is represented. The company to which the industrial plant belongs may have other industrial plants, for example in different countries or, in general, locations, but for the purpose of the present disclosure, an industrial plant is depicted. The plant 1000 is composed of several industrial lines, forming a second level. As a matter of example, in FIG. 1 four lines 1100, 1200, 1300, 1400 of the plant 1000 are shown. A third deployment level is composed of machines which form part of each industrial line. For example, in FIG. 1, two machines 1101, 1102 belonging to line 1100 are schematized. The machines 1101, 1102 belonging to line 1100 comprise several components. For example, the machine 1101 may be a machining tool comprising a machining unit 1101a, a tool 1101b, etc. Each component may have, in turn, several elements; for instance, the machining unit may comprise servomotors for moving the machining unit along 3 axis and a spindle. The spindle in turn comprises different sub-elements to be controlled, such as a motor and a bearing. The scheme of FIG. 1 represents the hierarchy of the electrical connection of the industrial plant. In addition, an industrial line may encompass several processes. For example, a process may involve several machines. The structure of the industrial plant schematized in FIG. 1 is illustrative and intends to show the hierarchical energy monitorization distribution of an industrial plant and therefore to reflect the capacity of the method of the present disclosure to work with data of different hierarchical energy monitorization levels. The shown structure should therefore not be considered in a limitative way, other hierarchical industrial structures being also possible.

Some or all of the different components at different levels in the industrial plant are associated to sensors, not shown in FIG. 1. The sensors may be energy measuring sensors, such as electricity measuring sensors or gas measuring sensors, and sensors for measuring other physical energy-related magnitudes, such as temperature, air pressure and flow rate, such as gas, oil or water flow rate, etc. Communication protocols, which are out of the scope of the present disclosure, may enable the recording of controller signals. For example, an energy management system (EMS) may be used to collect the measurements captured by the sensors at different levels in the industrial plant: total plant consumption of an industrial plant, consumption of a production line, consumption of a process, consumption of a machine, consumption of different components of a machine, etc. The method also encompasses indirect measurements, that is to say, measurements based on indirect inferences. For example, if the principle of energy conservation is used, the energy associated to unmonitored loads can be deducted by simply knowing the total energy of a transformer to which both monitored and unmonitored loads are connected, and the energy of monitored loads associated to the transformer. Subtracting the energy of the monitored loads from the total energy of the transformer gives the energy of the unmonitored loads. In sum, the method encompasses direct measures and also indirect measures inferred from the previous ones. As a matter of example, if there is a meter that monitors the total energy consumed by a plant having 40 machines and, the energy consumption of 30 of the 40 machines in the plant is also monitored, it is possible to infer the aggregate consumption of the 10 unmonitored machines by subtracting from the consumption measured by the plant meter the aggregate sum of the monitored consumptions of those 30 machines.

The measurement can also be classified as productive loads measurements, productive loads being loads associated to production, auxiliary loads measurements, auxiliary loads being loads not directly associated to production, and unmonitored loads measurements. Depending on the industrial level and on the type of element or load, the consumption may be directly obtained from a measuring sensor (this may be the case, for example, of a component of a machine), or indirectly obtained, either from different measuring sensors (this may be the case, for example, of a production line or plant) or from indirect inferences as already explained. The measurements are usually stored, either locally or in the cloud, for their later analysis, evaluation, monitoring and/or processing. Measurements are taken at different time instants, such as periodically. Preferably, some or all of the captured data must have the same time discretization. For this reason, a time homogenization function may be used for obtaining a consistent data set for some or all of the measurements made at one or more levels of the industrial plant.

In addition, currently, in many industrial plants, production data are also measured and stored, for example by manufacturing execution systems (MES), usually independent from EMSs. Production data refers to the production (for example, in kilograms (kgr, $10^3$ gr) of something, such as processed material, or simply number of produced items) achieved at a certain level (for example, line level or machine level) for a certain time period, such as, but not limiting, per day.

Figure 2:
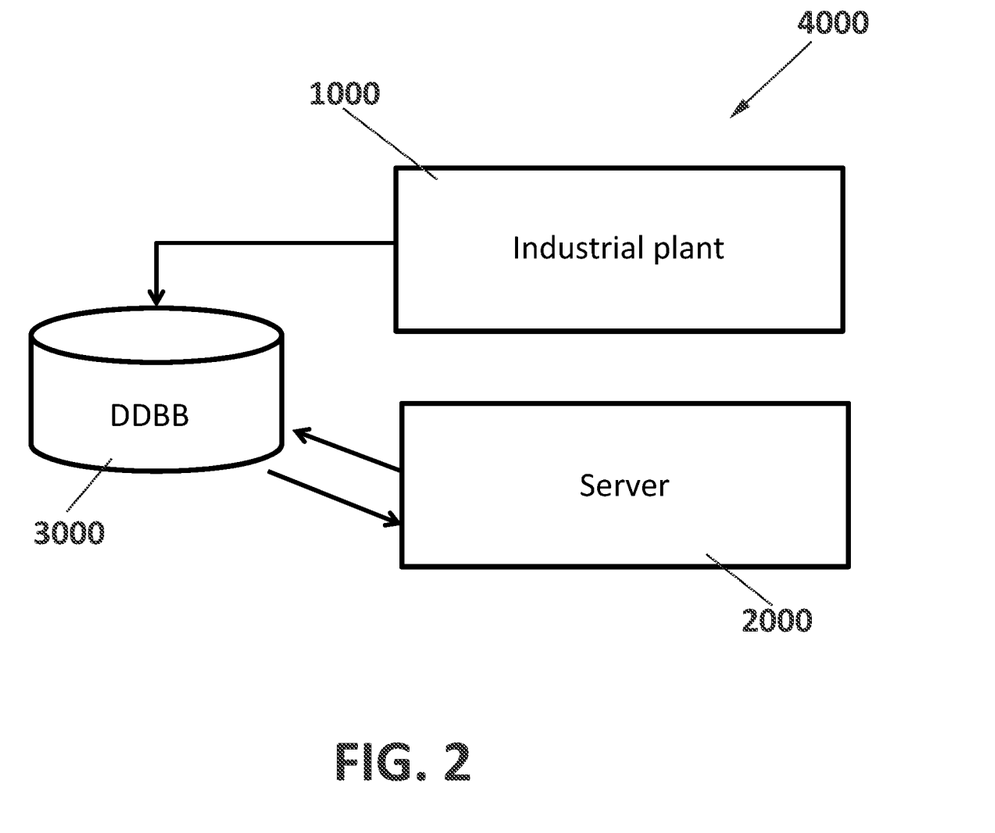
FIG. 2 illustrates a scheme of a cyber-physical system suitable for performing the method of the present disclosure.

FIG. 2 illustrates a block diagram 4000 of the elements involved in the execution of the method of the present disclosure. Block 1000 represents at least one industrial plant 1000, such as the one illustrated in FIG. 1. The at least one industrial plant 1000 forms a cyber-physical system, understood as a set of machines bidirectionally connected between each other and capable of interacting with each other according to the industrial plant operation. The block diagram 4000 also shows at least one processing means 2000, represented in FIG. 2 by a server. The method of the present disclosure is applied and/or executed in the at least one processing means 2000. The industrial plant 1000 represents the physical world, that is to say, the set of lines, processes, machines, components, associated sensors, etc., while the processing means 2000 represents the computational world. The block diagram 4000 also shows storing means 3000, in which the data measurements collected from the different hierarchical levels of the industrial plant 1000 are stored. A non-illustrated monitoring platform is in charge of collecting data from machines, components, lines, processes etc. and storing the data in the database 3000. The storing means 3000 may be located either locally, for example within a local network of the industrial plant, or remotely, for example in the cloud. The processing means, such as server, 2000 collects the stored data and performs the method of the present disclosure. The processing means 2000 may be located either locally, for example within a local network of the industrial plant, or remotely, for example in the cloud or in any other environment providing enough computation capacity. Thus, in order to evaluate the energy consumption in an industrial plant 1000, the collected energy consumption data, measured at different levels, such as plant level, line level, machine level, and so on, including potential indirect inferences, and stored in database 3000, is used by the processing means 2000 to perform the required analysis. In addition, production data of the different hierarchical levels in the industrial plant 1000 may also be captured and stored, if the industrial plant is equipped with a system for measuring and capturing production data. Data loading into the processing means 2000 may be done periodically, such as on a daily basis and preferably at a predetermined time, or may be done at any moment at which the energy consumption is going to be evaluated.

From the data measurements collected from the different hierarchical levels of the industrial plant, loads of different nature may be separated.

In some embodiments, loads (energy measurements) are separated or divided into three groups: (1) productive energy measurements, which are energy measurements associated to production; productive energy measurements may involve energy analysis (for example may contribute to the creation of patterns) and production analysis; (2) auxiliary energy measurements and (3) non-monitorized energy measurements. Auxiliary and non-monitorized energy measurements are not directly associated to production and therefore may only involve energy analysis, but not production analysis.

Separating energy measurements of different nature allows not processing them together, which would cause uncertainty when detecting energy inefficiencies, for example because energy measurements in fact not associated to production would actually be associated thereto. This would cause spoiling of the space occupied by the characteristic patterns, as will be disclosed next, and their natural variability, and could even overlap, potentially leading to the invalidation of the clustering techniques since different behaviours might not be distinguishable. With the energy consumption data captured by the sensors at different time instants (for example with certain periodicity, that is to say, at certain time intervals Δt, such as every 15 minutes) for a certain time period T (for example, but not limiting, for a day), a plurality of J energy consumption curves $x_j$ is obtained. In other words, an energy consumption curve $x_j$ represents a profile of energy consumption measured with certain time discretization Δt, that is to say, at intervals Δt of certain periodicity, such as at 15-minute intervals. Sub-index "j" is a positive integer number denoting a specific energy consumption curve. In other words, j=0, 1, 2, . . . , J−1, J being a natural number. In this context, an energy consumption curve represents, for a certain component, machine, process, line, plant, etc., the distribution of energy consumption along a certain time period T (for example, a day) at discrete time instants Δt within said time period T. In other words, an energy consumption curve represents, along a certain time period T, discrete values of energy consumption corresponding to time intervals Δt into which said time period T is subdivided. The time period T along which energy consumption curves are represented may be, for example, a day, but also half a day, or even an hour or less. The discretization or subdivision of this time period is done by time intervals Δt at which the energy consumption is indicated. These intervals must be preferably equal, by means of periodic measuring sampling. The discretization of the time period T may be hours, half hours, quarter hours or even lower. Thus, $x_{ij}$ is the i-th component of the j-th energy consumption curve, where in "i" represents the discrete time interval Δt which the energy consumption is measured (mean power between instants m=i−1 and i). For example, if a time period of 24 hours is defined and the time period T is divided into discretization intervals Δt of 15 minutes, then i varies from 0 to 95. In other words, an energy consumption curve represents the energy consumption of a component, machine, process, line or plant, indicated (measured, including indirect inferences) at regular time intervals Δt within a whole time period T (for example, daily).

Figure 3:
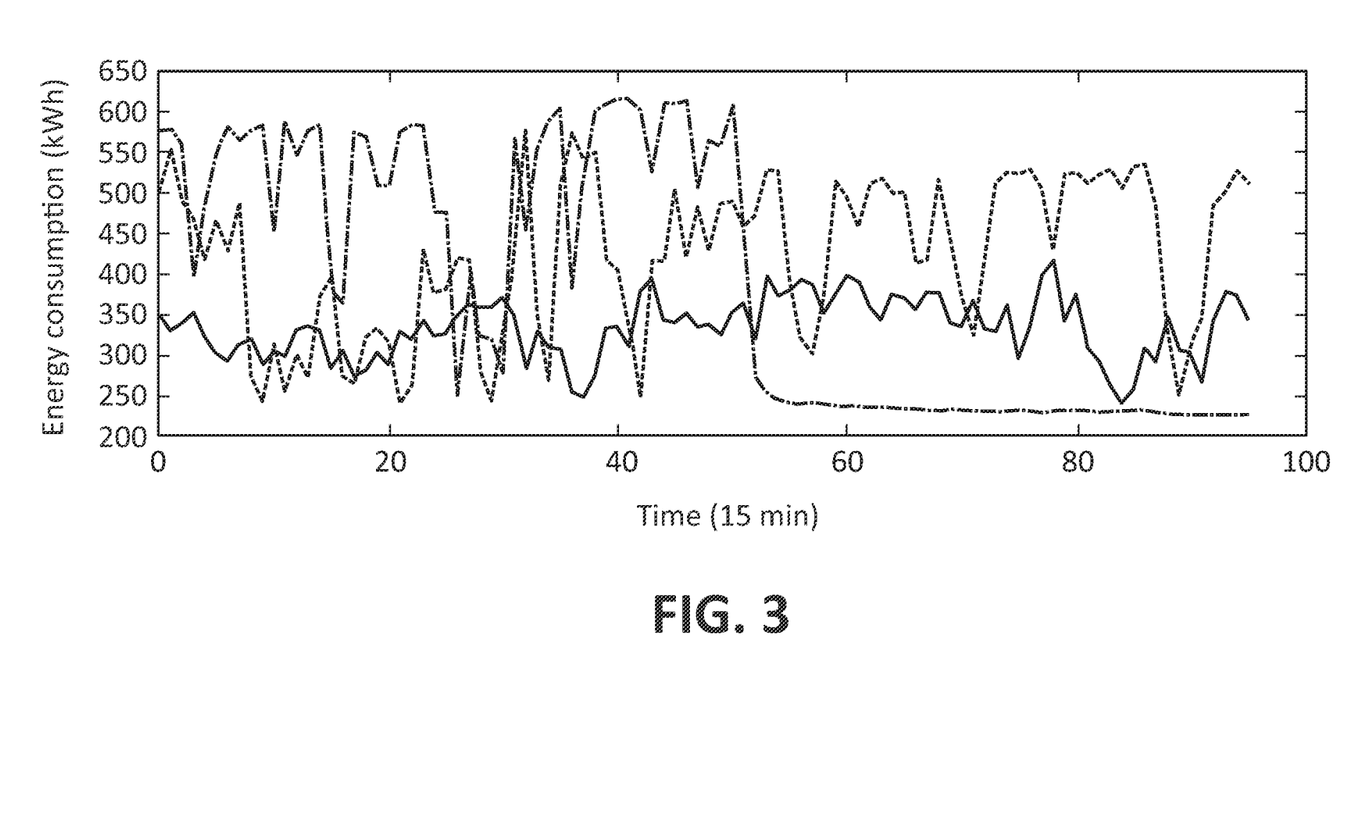
FIG. 3 shows an example of energy consumption curves obtained according to embodiments of the present disclosure.

A time horizon H is defined as a set of time periods T (such as days, halves a day, hours, etc.) used to extract characteristic patterns. The time horizon H may be considered as a training horizon, in order to obtain historic data with which daily data may be compared. For example, the time horizon H may be selected to be one month (30 days), the time period T along which energy consumption curves are represented may be selected to be 1 day and the time discretization interval (time interval) Δt of the energy consumption curves may be selected to be 15 minutes. In this case, in the selected time horizon H there will be 30 energy consumption curves, each of them having 96 values. FIG. 3 shows an example of energy consumption curves. In particular, FIG. 3 shows three energy consumption curves of an industrial plant along three different 24-hour time periods. The time horizon is therefore 72 hours. The temporal discretization interval is 15 minutes, that is to say, energy consumption has been measured every 15 minutes. Therefore, each curve has 96 values corresponding to the 24-hour time period.

As already explained, the energy consumption profiles may correspond not only to productive loads measurements, but also to auxiliary loads measurements and unmonitored loads measurements. Besides, depending on the element of the industrial plant to which the energy consumption curve corresponds, the curve may represent the cumulative energy consumption of different components, such as direct energy consumption measurements (this is the case, for example, of a low level component, such as a spindle) or indirect energy consumption measurements, which correspond to the aggregated measurements of different components comprised in an upper level of the industrial plant. In other words, energy consumption curves may be obtained at different submetering levels, such as at the different levels of the industrial plant illustrated in FIG. 1. In this context, the expression "submetering level" is understood to be each of the different hierarchical energy monitorization levels in the industrial plant.

Optionally, for each industrial plant item, for each one of the J generated energy consumption curves $x_j$ for example obtained in J different days forming a time horizon H, it may be verified whether or not the data is complete, that is to say, it may be verified whether or not there is any absence of measurements, due to, for example, errors in one or more measuring sensors, failure in the communications link, or any other reason. When absence of data is detected, data may be filled in. In embodiments of the disclosure, data is filled only when the absence of data does not extend over time more than a certain maximum time duration previously established as threshold. Different techniques based on mathematical formulations may be used for filling in data in the energy consumption curves. For example, but in a non-limiting way, missing data may be filled in with the mean value of the energy consumption curves belonging to a same cluster or pattern (which is explained next), by selecting the mean value at the missing time instants.

Once, for a certain time horizon H, a plurality of J energy consumption curves $x_j$ has been obtained for a certain element of the industrial plant or, in other words, for a certain submetering level, also called aggregation level, and optionally filled in if required, a plurality of K energy consumption patterns $C_k$ is created at that level. Energy consumption patterns $C_k$ are obtained from the similarity-based association of a set of energy consumption curves $x_j$. Therefore, energy consumption patterns are extracted for a same submetering or aggregation level, wherein similar energy consumption curves may be expected. Sub-index "k" is a positive integer number denoting a specific energy consumption pattern. In other words, k=0, 1, 2, . . . , K−1, K being a natural number. Generally, K≤J, and in practice K<J.

The energy consumption patterns $C_k$ are obtained from a set of the energy consumption curves $x_j$. The energy consumption patterns $C_k$ are obtained by comparing the energy consumption curves of a set thereof following a certain mathematical metric and identifying similar energy consumption curves $x_j$ according to a similarity metric, also referred to as proximity metric. In other words, in this context, similarity means proximity in terms of a certain mathematical metric. Thus, an energy consumption pattern represents an energy behavior or model that represents a set of energy consumption curves (similar energy consumption curves). In a non-limiting example, the similarity metric used to group energy consumption curves into patterns is a Euclidean distance between curves. Usually, each energy consumption pattern puts together a group of energy consumption curves. In other words, an energy consumption pattern may be seen as a virtual (synthetic) energy consumption curve representing a certain group of real energy consumption curves that fulfil a similarity constraint imposed by or according to a certain similarity metric. In sum, the captured data are organized and relationships (in terms of similarity) between existing energy consumption curves are searched, thus creating/obtaining different patterns of behavior represented by patterns. This is done by applying clustering techniques, also referred to as clustering algorithms. In embodiments of the disclosure, the K-means clustering technique is used, in which an optimal number of clusters is obtained using the elbow method, which studies the cumulative variance, and which is out of the scope of the present disclosure.

So, energy consumption patterns are obtained by analyzing the energy consumption curves in a certain time horizon H. This stage may be seen as a training stage. In the training stage, historical data, that is to say, energy consumption curves defined by energy consumption values in given time discretization intervals $\Delta t$, within a time period T and setting a training time horizon H, are analyzed. Each energy consumption pattern has the same discrete time intervals $\Delta t$ (for example, quarters of an hour). Besides, all the energy consumption curves must have the same time period T (for example, a day). During the training stage, for each time interval $\Delta t$ (for example, every 15 minutes), the pattern has a value that is computed from the corresponding values, for the same time interval $\Delta t$, of the different energy consumption curves belonging to the set represented by the pattern. Each value (at each time instant) of a pattern is obtained by calculating, for instance, the mean value of all the values corresponding to all the energy consumption curves of the set, at the corresponding time instant. The goal of this computation is to obtain an energy consumption pattern, that is, the most similar curve in quantity (value of energy consumption) and form (also referred to as tendency) to the set of energy consumption curves that have participated in the computation in a defined time horizon.

The following formulation represents a clustering algorithm or computation that may be used for obtaining K energy consumption patterns $C_k$ from J energy consumption curves $x_j$, wherein K<J:

$$\arg\min\{\Sigma_{i=1}^{I}\|x_{ij}-C_{ik}^{t}\|\forall k=1,\ldots,K\}$$

wherein $x_{ij}$ is the i-th component of the j-th energy consumption curve $X_j$, $C_{ik}^{t}$ is the i-th component of the k-th energy consumption pattern, K is the total number of energy consumption patterns and I is the number of measurements within the whole time period (for example, 96 measurements taken along 1 day; that is to say, one measurement taken every 15 minutes). In embodiments of the disclosure, each pattern is calculated as the mean value of the energy consumption curves belonging to said pattern, at each component i. The former formulation represents the iterative process for identifying the curves belonging to a pattern, by minimizing the distance between the elements forming a cluster and its corresponding pattern.

In embodiments in which K-means clustering is applied, the optimum number of patterns $C_k$ for the whole set of curves $x_i \; \forall \; i=1,\ldots,J$ is given by the point of maximum deflection in the representation of the variance between groups (clusters) divided by the total variance of the selection from the set of curves, that is to say, if the elbow method is used:

$$\mathrm{argmax}\left\{\left(\frac{VAR_{in}^{k+1}}{VAR}\right)-\left(\frac{VAR_{in}^{k}}{VAR}\right)\right\}, \forall \; k=1,\ldots,K$$

wherein $VAR_{in}$ is the variance between the elements of a cluster or group and VAR is the total variance of the selection, and wherein $VAR_{in}$ is defined:

$$VAR_{in}=\Sigma_{k=1}^{K}n_k(C_k^t-\overline{C^t})/(K-1),$$

wherein K is the total number of clusters, each cluster being represented by an energy consumption pattern and all its energy consumption curves related by a similarity metric, $n_k$ is the number of elements forming the k-th group or curves, $C_k^t$ is the characteristic pattern for the k-th group of curves and $\overline{C^t}$ is the mean pattern of the whole selection of energy consumption curves.

The clustering algorithm, such as K-means, is an iterative algorithm, in which energy consumption curves are compared one to one and energy consumption curves are associated to patterns. Patterns are recalculated iteratively until all the energy consumption curves have been associated to a pattern. The degree of similarity/dissimilarity of new energy consumption curves with respect to current patterns may be evaluated as follows:

$$x_j \in C_k^t f \text{ or } k/\arg\min\{\|x_j-C_k^t\|\forall j=1,\ldots,J,k=1,\ldots,K\}$$

wherein $x_j$ is the j-th energy consumption curve and $C_k^t$ is the k-th pattern.

The process of obtaining patterns is iterative. There will be as many patterns as different behaviours are identified among the different energy consumption curves within the selected time horizon. A pattern creation process is finished when all the energy consumption curves within a same pattern are more similar with each other than with any other curve belonging to a different pattern. Later, during the—for example—daily execution of the method of the present disclosure for daily evaluation of energy consumption, new energy consumption curves will be compared with the obtained patterns for further evaluation of—for example daily—energy behaviour.

Figure 4:
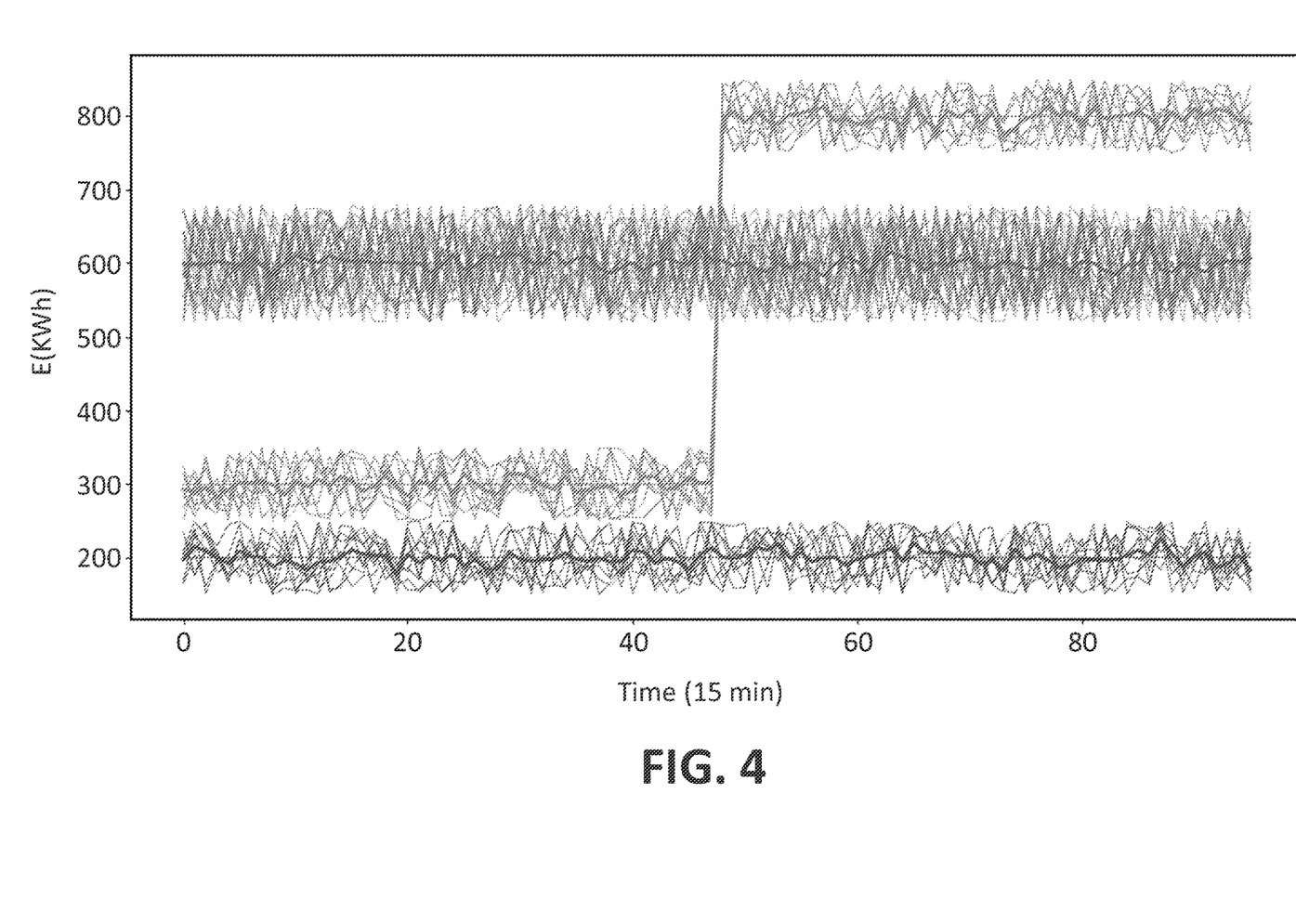
FIG. 4 shows an example of a set of energy consumption curves and the resulting energy consumption patterns to which the set of curves belongs, obtained according to embodiments of the present disclosure.

FIG. 4 represents an example of pattern calculation performed with the above mentioned formulae from a collection of energy consumption curves. The energy consumption curves were defined by electricity consumption data collected at the electric distribution grid connection point of an industrial plant. The training time horizon H was selected to be 50 days. The time period T used to conform the energy consumption patterns was 24 hours, measured on 15 minutes time interval $\Delta t$. There are therefore 50 energy consumption curves, each having a time period T of 24 hours. The energy consumption is represented in kWh (kilowatt hour). The figure shows clearly three different energy patterns, whose corresponding energy consumption curves are perfectly recognized. A first energy pattern (solid line at about 200 kWh in FIG. 4) groups 10 energy consumption curves (thin lines), a second energy pattern solid line partially at about 300 kWh and partially at about 800 kWh in FIG. 4) groups 20 energy consumption curves (thin lines) and a third energy pattern (solid line at about 600 kWh in FIG. 4) groups 20 energy consumption curves (thin lines). In each pattern, each value may be obtained as the mean value—at each time instant— of the corresponding values of the curves represented by the pattern.

So far, a training stage has been disclosed, in which, for a component, machine, production line, process, etc., new energy consumption curves may be repeatedly obtained for different time periods T (T being, for example, a day). This is repeated for a certain time horizon, such as one or more months, or whatever. The energy consumption curves may be stored for further analysis and/or processing. For each component, machine, line, etc., the database, for example the database 3000 shown in FIG. 2, may contain the recordings (energy consumption curves) of energy consumption for any selected time horizon. This historic data are typically used in a training stage performed prior to the daily execution of the method of the present disclosure.

Once a set of K energy consumption patterns $C_k$ having a certain time period T is available, for example obtained during a training stage performed with data obtained during certain time horizon H, with the analysis applied to the energy consumption data of the method of the present disclosure, it is possible to identify any characteristic behaviour (statistical behaviour) derived from energy consumption curves, even if it occurs rarely. For example, the method of the present disclosure permits to extract, for each component, machine, etc. of the industrial plant, the maximum energy consumption day and the minimum energy consumption day associated with each of the characteristics patterns extracted from the historical training data set In embodiments of the disclosure, once a set of K energy consumption patterns $C_k$ having a certain time period T is available, and using the production data corresponding to said certain time period T, the production is compared with the energy consumption curves comprised in each one of the energy consumption patterns in order to, for example, detect possible energy inefficiencies. Production data is usually obtained for time intervals larger than the discretized time intervals Δt at which energy consumption is measured by sensors. For example, while sensors may be configured to measure the consumed energy at a certain component (or machine, etc.) in an industrial plant every 15 minutes (discretized time interval Δt), production data associated to said component (or machine, etc.) may typically only be available every 8 hours (working time period) or even at larger periods. For this reason, in order to compare energy consumption with production with respect to a same time period T, the aggregated energy consumption for each time period T is preferably obtained from the energy consumption curve of the time period, for example one day.

Figure 5:
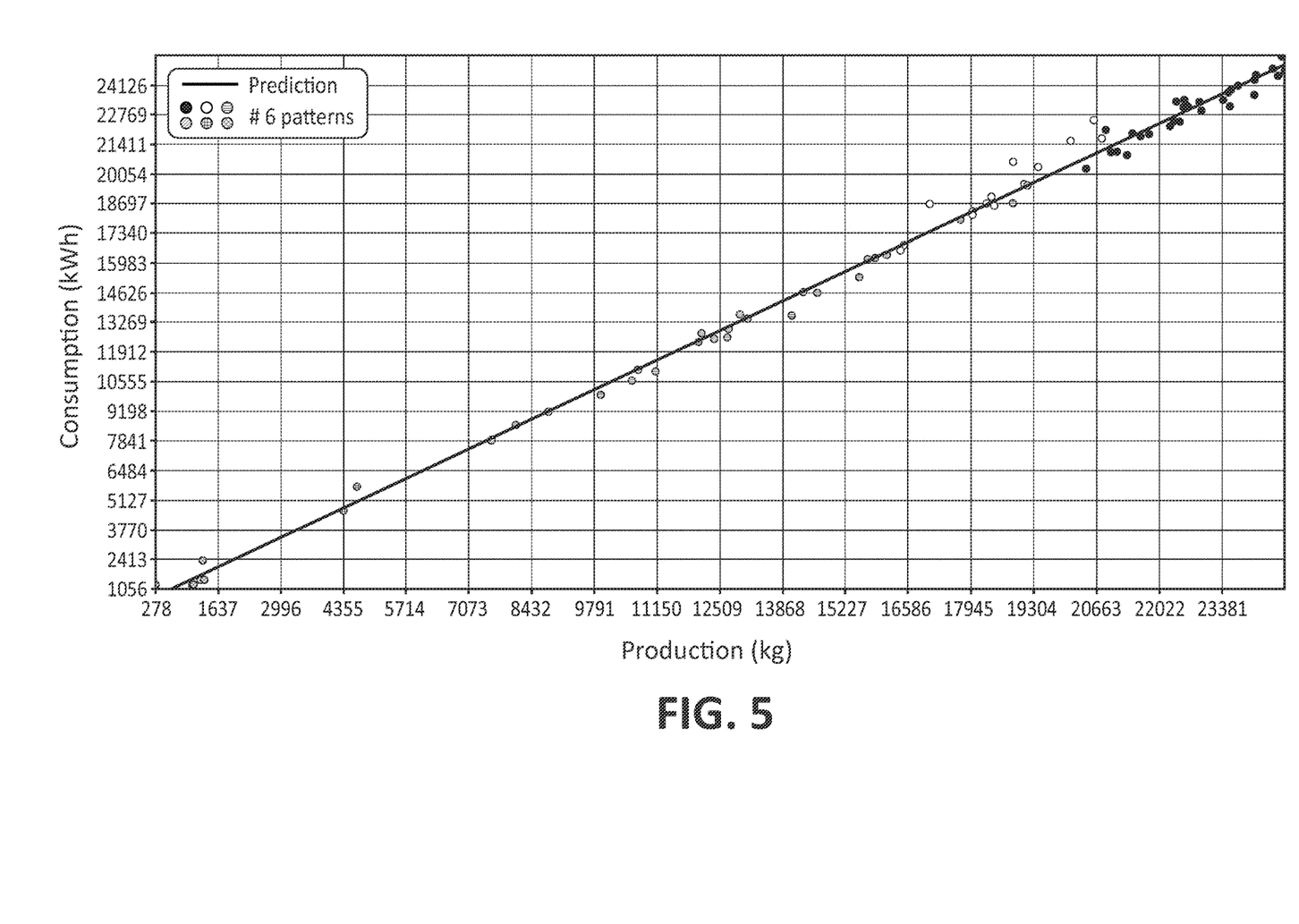
FIG. 5 shows a graph representing the production versus the energy consumption, obtained according to embodiments of the present disclosure.

In other words, with the aggregated energy consumption values obtained for a certain time period, and the production values obtained for the same time period, energy versus production is represented and a relationship between energy and production is inferred, as depicted in FIG. 5. There, aggregated energy consumption versus production of periods having a similar consumption pattern is shown. FIG. 5 shows a graph representing the production (in kg) versus the aggregated energy consumption (in kWh) in a given energy-production analysis time period corresponding to an industrial plant. Each type of dot (black dot, white dot, horizontal-striped dot, etc.) represents the aggregated energy consumption of an energy consumption curve in the time period (for example, one day) in relation with the production in the same time period. Therefore, the total number of dots corresponds to the amount of time periods (i.e. days) within the time horizon under analysis. Each cluster is represented by a different type of dot (black, white, horizontal-striped, oblique-striped, etc.). In other words, each type of dot identifies the energy consumption curves associated to a same pattern. In the example, as a result of a previous pattern calculation exercise (training stage), not illustrated, the energy consumption curves in the selected time horizon were grouped in six -6- energy patterns. The continuous line represents an interpolation, that is, a line that best adjusts the represented set of points. In this case, this line is a straight line obtained by means of an adjustment for least squares. This line serves to represent the relationship energy vs. production. In the case of an adjustment for least squares, this adjustment is characterized by a statistical magnitude: Chi2. This metric is used, when contrasting for example a new day, to determine whether that day responds to the historical relationship (it does not worsen the Chi2) or if does not (it worsens Chi2) in which case a production alarm may be triggered. Thus, if for example production data is available every 24 hours, the aggregated energy consumption for 24 hours is obtained for each curve forming each pattern. Later, during for example daily execution of the method of the present disclosure, by comparing the daily production of a certain element or machine (or, in general, sub-metering level in the industrial plant) with the aggregated energy consumption of all curves forming the K patterns (in the example, K=6), it is possible to prevent false energy inefficiency alarms (that is to say, alarms associated to energy inefficiency). In other words, if an increase in energy consumption is caused by an increase in production, no alarm should be triggered. On the contrary, if an increase in energy consumption is not associated to an increase in production, an alarm should be triggered. Therefore, production is extremely important in order to prevent false alarms.

It is therefore possible to bi-dimensionally represent the ratio energy vs production, as shown in FIG. 5. A mathematical formulation that represents this ratio is explained next. In other words, it is explained how to compute the ratio energy-production according to embodiments of the disclosure. The goal is to detect intensive energy consumption, higher than expected, not associated with production increases.

From a mathematical point of view, given a set of historic production data (typically 1 value per day) and historic energy consumption data (as the aggregation or integration of values of an energy consumption curve), a graphical representation of production vs energy is performed. In this graphical representation, there are as many points as historic days (time periods) are used in the analysis for obtaining energy consumption patterns (training stage).

This is shown in FIG. 5.

The relationship between the set of pairs of energy—production $\{E_i|P_i\}_{i=1}^{N}$, wherein $E_i$ and $P_i$ are respectively, in a particular embodiment, daily values of energy and production, and N is the set of days (time horizon) used in the training stage, may be expressed as follows:

$$E_i = f(P_i)$$

In other words, the goal is to find out the function f that minimizes the error:

$$e_i = E_i - f(P_i)$$

In order to do so, the root-mean-square error (RMSE) may be used:

$$RSME = \sqrt{\frac{\sum_{i=1}^{N}(e_i)^2}{N}}$$

Thus, the goal is to find out the constant values $c_i$ that minimize the RSME, whose value is obtained from the Gauss normal equations that result from:

$$\frac{d(RSME)}{dc_i} = 0$$

Whose formulation and mathematical resolution is well-known. For example, for $E_i=aP_i+b$, by solving the previously defined Gauss normal equation, coefficients a and b are:

$$a = \frac{N(\Sigma P_i E_i) - (\Sigma P_i)(\Sigma E_i)}{N(P_i^2) - (\Sigma E_i)^2}$$

$$b = \frac{(\Sigma E_i) - a(\Sigma P_i)}{N}$$

In sum, by minimizing the root-mean-square error (RMSE), the quality of the computation of energy-production ratio is evaluated. In other words, the curve minimizing the RMSE is used for evaluating the quality of the energy-production ratio. Later, during for example daily execution of the method of the present disclosure, any new day may be represented and analyzed in a similar way, thus evaluating whether an energy consumption increase required for producing certain amount of production (kg) is an energy inefficiency or not.

The graph like the one of FIG. 5 allows to detect inefficiencies: for collections of periods (for example days) having a similar energy consumption behavior (pattern), aggregated energy consumption can be compared against obtained production: periods (days) with similar production but different (greater or lower) energy consumption can be identified, or periods (days) with similar energy consumption but different (greater or lower) productions can be identified; Also, if a certain period (day) has an energy consumption versus production ratio following the tendency of the periods of the pattern, or greater, or lower, can be observed.

So far, the energy behavior of an industrial plant (or, more generally, of a sub-metering level thereof) has been analyzed by analyzing historic patterns, such as the pattern illustrated in FIG. 4. Next, the analysis performed every time a new energy consumption curve is obtained from data captured from the industrial plant, is explained based on this statistical inferred behaviour. Once several (K) patterns are obtained during a training stage using data collected for a certain time horizon, every time a new energy consumption curve is obtained, for example on a daily basis, it is determined to which pattern the new curve belongs (if it belongs to any, as will be explained later). This is done by comparing the new curve with the K patterns. This comparison is done according to a similarity metric. The degree of similarity/dissimilarity of a new energy consumption curve with respect to existing patterns may be evaluated as follows:

$$x_j \in C_k^t \text{ if or } k/\arg\min\{\|x_j - C_k^t\| \forall j=1,\ldots,J, k=1,\ldots,K\}$$

wherein $x_j$ is the j-th energy consumption curve and $C_k^t$ is the k-th pattern. In embodiments of the disclosure, the new energy consumption curve, under evaluation, is associated to the pattern of the set of K patterns having minimum distance, provided said minimum distance is not larger than the distance from the farthest curve within said pattern.

In other words, given an energy consumption curve of a new day (in general, time period), it can be confronted against the analyzed energy behavior represented by patterns. In other words, a new energy consumption curve can be evaluated with respect to a discrete model of energy behavior (that is to say, with respect to an energy consumption pattern). For a new energy consumption curve $x_j$, this evaluation may be done using mathematical similarity/dissimilarity formulations, such as as follows:

$$A_i^t = \{x_j \mid \|x_j - C_i^t\| \leq \|x_j - C_k^t\| \forall 1 \leq k \leq K\}$$

wherein $A_i^t$ is the i-th group, $x_j$ is the j-th energy consumption curve, $C_i^t$ is the pattern for the i-th group and K is the total number of patterns. That is to say, a new energy consumption curve belongs to a certain pattern if the distance to the centroid of said certain pattern is smaller than the distance to any other centroid (centroid of any other pattern), provided said minimum distance is not larger than the distance from the farthest curve within said certain pattern.

So far, for every new energy consumption curve obtained from sensor data at a new time period T, the degree of similarity/dissimilarity with respect to current patterns is evaluated by comparing the new energy consumption curve with the K patterns, or with each curve belonging to each pattern, already defined (for example in a training stage). And, if the new energy consumption curve mathematically fits in a previously defined pattern in terms of a similarity metric, it is determined that the new energy consumption curve belongs to that pattern in which the new energy consumption curve fits.

Two scenarios may arise: In a first scenario, the new energy consumption curve is explained by a previous discrete energy model (pattern), that is to say, the new energy consumption curve mathematically fits in a previously defined pattern in terms of a similarity metric. In this case, the new energy consumption curve is digitally compared with all the energy consumption curves that belong to the cluster represented by the pattern to which it belongs. This is performed at processing means, for example at processing means 2000 as shown in FIG. 2. In embodiments of the disclosure, if as a result of this evaluation it is determined that the new energy consumption curve belongs to a certain energy consumption pattern, the new energy consumption curve is associated to the group of curves represented by said pattern and the energy consumption pattern is updated by including the new energy consumption curve. When the new energy consumption curve is digitally compared with all the energy consumption curves that belong to the cluster represented by the pattern to which it belongs, the new curve is compared, among others, with the curve of maximum energy consumption and with the curve of minimum energy consumption within the cluster.

In a second scenario, the new energy consumption curve is not explained by a discrete energy model (pattern) generated during the selected time horizon. In other words, the new energy consumption curve does not fit in a previously defined pattern in terms of a similarity metric. In this case, it may represent an anomalous consumption, in which case an alarm associated to energy consumption (energy alarm) may be generated or triggered.

Alternatively, it may represent the appearance of a new type of consumption behavior, that is, a new pattern. In other words, for every new energy consumption curve (for example, every day), it is checked whether it should cause an energy alarm or not. This may be done by comparing the new energy consumption curve with the K patterns already defined for example during a historic data analysis or training stage.

If as a result of this evaluation it is determined that the new energy consumption curve does not belong to any of the K energy consumption patterns, the new energy consumption curve may be compared with energy consumption curves of any pattern, or with production data associated to energy consumption curves.

In embodiments of the disclosure, the new energy consumption curve is compared with the closest energy consumption curve. In embodiments of the disclosure, "closest" should be understood as "closest according to a certain distance". For example, it may be the closest in Euclidean distance. In embodiments of the disclosure, the new energy consumption curve is compared with the day (curve) of minimum energy consumption. In embodiments of the disclosure, the new energy consumption curve is compared with the day (curve) of maximum energy consumption. If it is not similar to one of these curves to which it is compared, an energy consumption alarm may be generated. This comparison may be done automatically or on demand.

Additionally, the new energy consumption curve can be evaluated in terms of energy versus production. The production achieved during the time period of the new energy consumption curve is captured and stored, for example in database 3000. Once the new energy consumption curve has been subjected to the evaluation for determining whether or not it belongs to a discrete model of energy behavior (pattern), with its subsequent generation or not of an alarm associated to energy consumption, the new energy consumption curve is compared to an expected relationship of energy vs. production (for example obtained during historic data analysis or training stage, as represented for example in FIG. 5). In embodiments of the disclosure, data of the production achieved during the same time period of the new energy consumption curve is captured. The energy consumption and associated production during the time period of the new curve may be compared with the relationship energy vs production inferred from the historic curves. In embodiments of the disclosure, if the relationship energy vs. production of the new energy consumption curve cannot be explained by the statistical variability of the model inferred during the training stage, a production alarm may be generated. In other words, if as a result of the digital comparison it is determined that there is energy inefficiency, an alarm associated to the production is triggered. Turning back to FIG. 5, if a new energy consumption curve, represented as a new dot in the graph of FIG. 5, causes the already mentioned Chi2 to become worse, then it may be deduced that said energy consumption curve does not correspond to the derived production-energy ratio. Therefore, a production alarm may be triggered. Otherwise, it may be established that said new energy consumption curve represents an expected behavior.

In embodiments of the disclosure, the new energy consumption curve is compared with the day of most similar production, in which case it should be compared with a continuous interpolation line (see for example FIG. 5). This may result in the generation of a production alarm. This comparison may be done automatically or on demand.

In embodiments of the disclosure, the load or loads in the industrial plant that have caused said anomalous energy consumption are identified. That is to say, it is identified which load or loads have caused that the new energy consumption curve of the industrial plant does not belong to any identified pattern (cluster of curves); or have caused that the aggregated energy (obtained from the new energy consumption curve) versus production does not follow the profile (line) obtained with historic data.

In embodiments of the disclosure, once it has been identified a day (or time period, in general) against which the new energy consumption curve causing alarm (energy consumption alarm and/or production alarm) is going to be compared, sub-metering measurements may be used in order to interpret the difference in energy consumption. This may be done by comparing monitored loads with a selected reference profile, the reference profile being, for example, the day (curve) of minimum energy consumption among the curves in the same cluster, or the day (curve) of maximum energy consumption among the curves in the same cluster, or the day with most similar production, or any other reference profile. These monitored loads correspond to sub-metering levels of the level of higher hierarchy under analysis as shown for example in FIG. 1. Sub-metering implies analyzing the energy consumption associated to, for example, a specific process (i.e. hot stamping) in the two identified time periods (the new one and the selected for the comparison). For example, the energy consumption of the machines involved in the process may be individually analyzed. Or, for example, the energy consumption employed in climatization, illumination, or any other task, may be analyzed. Thus, for the total aggregated energy consumption, it is determined the energy consumption percentage that corresponds to each lower-level load (sub-metering load). This comparison may be represented in a chart, such as a Pie chart contrasting individual energy consumption associated to lower hierarchical levels. Other mathematical indicator that may be used for identifying excessive energy consumption is the correlation between the residuals (difference between the curve associated with the energy alarm and the reference profile used for comparison) and the individual loads associated to hierarchical lower levels. Bigger correlation means that the problem causing the inefficiency may be identified.

So, using sub-metering data, energy consumption percentages attributable to different components in a certain production level (line, process, machine, etc.) are broken down. This enables, for example, to identify an element causing energy inefficiency (and therefore, for example, causing an alarm). This procedure arises, for example, after the identification of the daily energy consumption curve having lowest or highest consumption associated with the energy consumption pattern most similar to the new energy behavior of the energy consumption curve that is being evaluated. Said choice arises after identifying, for example, the most similar pattern and the most extreme (lowest and highest) energy consumption curves associated with it, which will be potential candidates.

Besides, from time to time, defined by a configurable parameter, the generation of energy consumption patterns may be updated by using new energy consumption curves which have been measured after the current energy consumption patterns have been obtained in the time horizon used in the training stage. In other words, the historic data used, for example, for training, may be updated. Thus, new energy consumption patterns may be obtained taking into account the new energy consumption curves. In embodiments of the disclosure, the patterns are updated every time a new energy consumption curve is obtained. A new energy consumption curve is compared with each one of the K energy consumption patterns already defined. Also from time to time, defined by a configurable parameter, new models of energy consumption versus production may be obtained. Referring back to the two scenarios already discussed: In a first scenario, in which the new energy consumption curve mathematically fits in a previously defined pattern, then the new energy consumption curve is associated to the group of curves forming that pattern and the characteristic behavior (pattern) is recalculated, in a second scenario, in which the new energy consumption curve is not explained by a discrete energy model (pattern) already generated: If it is determined that the new curve represents an anomalous consumption, the new curve should not contribute to update a pattern. If, on the contrary, if it is determined that the new curve does not represent an anomalous consumption, it may be determined that it represents the appearance of a new type of consumption behavior, that is, a new pattern.

The disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. A computer-implemented method for evaluating the energy consumption in an industrial plant, the method including the following steps:
   at a plurality of time instants, capturing with a plurality of sensors, sensor data from at least one level of the industrial plant, wherein said plurality of sensors comprises energy measuring sensors,
   from said sensor data, digitally obtaining a plurality of energy consumption curves $x_j$, wherein j=0, 1, 2, ..., J-1, J being a natural number, an energy consumption curve representing, along a certain time period T, discrete values of energy consumption corresponding to time intervals $\Delta t$ into which said time period T is divided,
   from said energy consumption curves $x_j$, applying a clustering algorithm for digitally computing a plurality of K energy consumption patterns $C_k$, wherein k=0, 1, 2, ..., K-1, K being a natural number, K<J, wherein each energy consumption pattern $C_k$ represents a set of energy consumption curves $x_j$ grouped together according to a similarity metric, wherein each energy consumption pattern $C_k$ comprises discrete values of energy consumption corresponding to said time intervals $\Delta t$ into which said time period T is divided,
   capturing data of the production achieved during said time period T at said at least one level of the industrial plant,
   calculating, for each energy consumption curve belonging to each pattern, the aggregated sum of the discrete values of energy consumption during said time period T, thus obtaining the aggregated energy consumption for each energy consumption curve during said time period T, and
   digitally establishing a relationship between aggregated energy consumption for each energy consumption curve during said time period T and said captured data of production.

2. The method of claim 1, wherein stage of capturing with a plurality of sensors, sensor data from at least one level of the industrial plant, is done at periodic time instants separated at time intervals $\Delta t$.

3. The method of claim 1, wherein said at least one level of the industrial plant is at least one of industrial plant, line, process, machine or component of a machine.

4. The method of claim 1, wherein each component of energy consumption pattern $C_k$ is calculated as the mean value of corresponding components $x_{ij}$ of each energy consumption curve $x_j$ belonging to said pattern.

5. The method of claim 1, wherein said clustering algorithm applies the following iterative process for minimizing the distance between elements forming a cluster and its corresponding pattern:

$$\arg\min\{\Sigma_{i=1}^{I}\|x_{ij}-C_{ik}^{t}\| \forall k=1,\ldots,K\}$$

wherein $x_{ij}$ is the i-th component of the j-th energy consumption curve $x_j$, $C_{ik}^{t}$ is the i-th component of the k-th energy consumption pattern at time instant t, K is the total number of energy consumption patterns and I is the number of measurements within the whole time period, wherein the optimum number K of patterns for the whole set of curves $x_j \forall j=1, \ldots, J$ is given by the point of maximum deflection in the representation of the variance between groups divided by the total variance of the selection from the set of curves, that is to say:

$$\arg\max\left\{\left(\frac{VAR_{in}^{k+1}}{VAR}\right)-\left(\frac{VAR_{in}^{k}}{VAR}\right)\right\}, \forall k = 1, \ldots, K$$

wherein $VAR_{in}$ is the variance between the elements of a group or cluster, and wherein $VAR_{in}$ is defined:

$$VAR_{in}=\Sigma_{k=1}^{K}n_k(C_k^{t}-\overline{C^t})/(K-1),$$

wherein K is the total number of energy consumption patterns, that is to say, the total number of groups of energy consumption curves related by a similarity metric defined for a group, $n_k$ is the number of elements forming the k-th group or curves, $C_k^{t}$ is the characteristic pattern for the k-th group of curves and $\overline{C^t}$ is the mean pattern of the whole selection of energy consumption curves.

6. The method of claim 1, wherein for a new energy consumption curve obtained from sensor data at a new time period T, the degree of similarity/dissimilarity with respect to current patterns is evaluated by comparing the new energy consumption curve with the K patterns already defined and, if the new energy consumption curve mathematically fits in a previously defined pattern in terms of a similarity metric, it is determined that said new energy consumption curve belongs to said pattern in which the new energy consumption curve fits.

7. The method of claim 6, wherein if the new energy consumption curve mathematically fits in a previously defined pattern in terms of a similarity metric, the new energy consumption curve is digitally compared with all the energy consumption curves that belong to the cluster represented by the pattern, thus comparing the new curve with the curve of maximum energy consumption and with the curve of minimum energy consumption.

8. The method of claim 6, wherein if the new energy consumption curve belongs to an existing energy consumption pattern, the new energy consumption curve is associated to the group of curves represented by said pattern and the pattern is updated taking into account the new energy consumption curve.

9. The method of claim 6, wherein if the new energy consumption curve does not fit in a previously defined pattern in terms of a similarity metric, determining if the new energy consumption curve represents an anomalous consumption or if the new energy consumption curve represents the appearance of a new type of energy consumption pattern.

10. The method of claim 9, wherein if the new energy consumption curve is determined to represent an anomalous consumption, an alarm associated to the energy consumption is triggered.

11. The method of claim 10, further including the step of using sub-metering measurements to interpret the difference in energy consumption causing the anomalous consumption.

12. The method of claim 6, further including the following steps:
- capturing data of the production achieved during the same time period T of the new energy consumption curve, and
- digitally comparing the energy consumption and associated production during said time period of the new energy consumption curve, with the relationship energy versus production inferred from historic curves.

13. The method of claim 12, wherein if as a result of the digital comparison energy inefficiency is determined, an alarm associated to the production is triggered.

14. A system comprising processing means, the system being configured to perform the steps of the method of claim 1.

* * * * *